Patented June 12, 1951

2,556,325

UNITED STATES PATENT OFFICE 2,556,325

PRODUCTION OF 2:3-DIHYDROFURANS

Maurice Louis Auguste Fluchaire and Georges Collardeau, Lyon, France, assignors to Societe des Usines Chimiques Rhone-Poulenc, Paris, France, a French body corporate No Drawing. Application March 10, 1950, Serial No. 149,026. In France April 2, 1949

10 Claims. (Cl. 260—345)

The present invention relates to the production of 2:3-dihydrofurans. It is an object of this invention to provide a process for the preparation of 2:3-dihydrofurans by the isomerisation of 2:5-dihydrofurans.

According to the present invention a process for the production of a 2:3-dihydrofuran of the general formula:

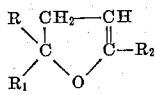

wherein R, R₁ and R₂ are each selected from the class consisting of the hydrogen atom and hydrocarbon groups, comprises heating a 2:5-dihydrofuran of the general formula:

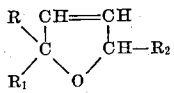

in the presence of an alkali metal alcoholate.

The groups R, R₁ and R₂ if not hydrogen atoms may each be selected from alkyl, aryl or aralkyl groups, e. g. lower alkyl groups such as methyl and ethyl or higher alkyl groups, and phenyl. Suitable alcoholates are the ethoxides, isopropylates and tertiobutylates of sodium and potassium. An alkali hydroxide and an alcohol may alternatively be employed and this combination is regarded as an alkali metal alcoholate within the meaning of that expression as used in this specification.

The reaction is in all cases preferably effected in an alcohol solution.

The reaction is surprising and unexpected since Henninger, Annalen der Chemie, [6], 7, 217 (1886), states that 2:5-dihydrofuran is not modified by heating with concentrated potassium hydroxide.

Other factors remaining unchanged, the speed of the reaction increases with the heating temperature, which must be sufficiently high to produce a technically acceptable speed of reaction. However, it is naturally necessary that the decomposition temperature of the products of the reaction should not be reached. Generally speaking, a temperature range of 100°–250° C. is satisfactory.

The quantity of alcoholate to be employed depends inter alia upon the particular alcoholate and the particular 2:5-dihydrofuran which is treated. The optimum proportion in each particular case may be determined by a simple preliminary test within the ability of any person skilled in the art, and it generally lies between 5 and 100 mol. of alcoholate to 100 mol. of the 2:5-dihydrofuran.

2:3-dihydrofuran produced according to this invention can be employed as intermediate products, for example in the synthesis of pharmaceutical products and in the plastics industry.

Whether the 2:3-dihydrofuran produced in the reaction need be isolated depends upon the purpose for which it is subsequently to be employed. It may be hydrolysed in the medium in which it has been formed, in order to obtain the corresponding γ-hydroxyl carbonyl derivative, and if desired the latter substance may be converted into another derivative, such as the oxime. Since the initial 2:5-dihydrofurans are not hydrolysable, this difference in the behaviour of the two isomers may be used in order to identify or separate them.

The 2:5-dihydrofurans employed as starting substances may be obtained by various known processes. It is known, for example, that unsubstituted 2:5-dihydrofuran can be obtained industrially by dehydration of 2-buten-1:4-diol. It is also to be noted that certain methods, such as the elimination of one mol. of halo-acid from 4-halogeno-tetrahydrofurans, give a mixture of 2:3-dihydro- and 2:5-dihydrofurans (Normant, Comptes Rendus, 227, 283 (1948)). The present invention provides a means of enriching such a mixture with the 2:3-isomer or of converting it substantially completely into 2:3-dihydrofuran.

The following examples, in which the parts by weight, serve to illustrate the present invention but are not to be regarded as limiting it in any way:

Example I

A mixture of 2 parts of caustic potash, 6 parts of tertiary butyl alcohol and 3 parts of 2:5-dihydrofuran is heated in a closed vessel at 190° C. for 7 hours. On fractional distillation of the product of the reaction, 2:3-dihydrofuran is isolated. B. P. 54.3° C./760 mm. $n_D^{15}=1.4282$. Yield: 84% of that theoretically possible.

Example II

A mixture of 100 parts of 2:5-dihydrofuran and a solution obtained by dissolving 10 parts of sodium in 125 parts of absolute ethyl alcohol, is heated in a closed vessel at 200° C. for 12 hours. The product of the reaction is distilled. The 2:3-dihydrofuran contained in the distillate is hydrolysed by an excess of water in the presence of an excess of hydroxylamine hydrochloride. After neutralisation of the hydrochloric acid liberated by the reaction, the oxime of the γ-hydroxy-butanol is isolated by known methods. (Paul, Bull. Soc. Chim., 197 (1948).) B. P. 135°–136° C./8 mm. $n_D^{15}=1.473$ $d_{18}^{12}=1.121$.

Example III

A mixture of 30 parts of 2:5-dihydrofuran and the solution obtained by dissolving 4 parts of sodium in 250 parts of tertiary butyl alcohol is heated in a closed vessel at 200° C. for 12 hours. Fractional distillation of the product of the reaction gives 2:3-dihydrofuran.

Example IV

A mixture of 100 parts of 2:5-dihydrofuran and of a solution obtained by dissolving 6 parts of potassium in 100 parts of tertiary butyl alcohol is heated in a closed vessel at 170° C. for 6 hours. Distillation of the product of the reaction results in the separation of the 2:3-dihydrofuran, distilling at 54° C. at normal pressure. Yield: 94% of that theoretically possible.

On heating under the same conditions a mixture of 100 parts of 2:5-dihydrofuran and 15 parts of potassium tertiobutylate free from free tertiary butyl alcohol (corresponding to 6 parts of potassium), a 77% yield of 2:3-dihydrofuran is obtained.

Example V 5 parts of methyldihydrofuran, obtained by the action of caustic potash on 2-methyl-4-bromo-tetrahydrofuran, containing 37% of the 2:3-isomer, are mixed with the solution obtained by dissolving 1.2 parts of potassium in 20 parts of tertiary butyl alcohol. This mixture is heated in a closed vessel at 170° C. for 4 hours. The product of the reaction is diluted with a mixture of water and ethyl alcohol, neutralised and treated with an excess of hydroxylamine hydrochloride. The quantity of hydrochloric acid liberated by the formation of oxime corresponds to a 52% content of hydrolysable isomer, calculated on the initial methyl dihydrofuran.

Example VI 33 parts of diethyldihydrofuran, obtained by the action of caustic potash on 2:2-diethyl-4-bromo-tetrahydrofuran, containing 63% of the 2:3-isomer, are added to a solution obtained by dissolving 6 parts of potassium in 100 parts of tertiary butyl alcohol. This mixture is heated in a closed vessel at 210° C. for 12 hours. The product of the reaction is diluted with a mixture of water and ethyl alcohol, and then neutralised and treated with an excess of hydroxylamine hydrochloride. The quantity of hydrochloric acid liberated by the formation of oxime corresponds to a 75% content of 2:2-diethyl-2:3-dihydrofuran, calculated on the initial diethyldihydrofuran.

We claim:

1. A process for the production of a 2:3-dihydrofuran of the general formula:

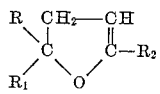

wherein R, R₁ and R₂ are each selected from the class consisting of the hydrogen atoms and lower alkyl groups, which comprises heating a 2:5-dihydrofuran of the general formula:

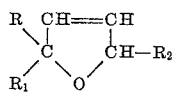

in the presence of an alkali metal alcoholate.

2. A process for the production of a 2:3-dihydrofuran of the general formula:

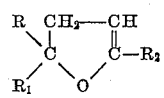

wherein R, R₁ and R₂ are each selected from the class consisting of the hydrogen atoms and lower alkyl groups, which comprises heating a 2:5-dihydrofuran of the general formula:

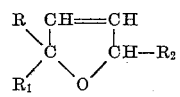

in the presence of an alkali metal alcoholate in alcoholic solution.

3. A process for the production of 2:3-dihydrofuran which comprises heating 2:5-dihydrofuran in the presence of an alkali metal alcoholate.

4. A process for the production of 2:3-dihydrofuran which comprises heating 2:5-dihydrofuran in the presence of an alkali metal alcoholate in alcoholic solution.

5. A process for the production of 2:3-dihydrofuran containing a lower alkyl group in the 2-position which comprises heating 2:5-dihydrofuran containing a lower alkyl group in the 2-position with an alkali metal alcoholate.

6. A process for the production of a 2:3-dihydrofuran of the general formula:

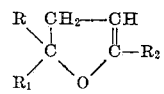

wherein R, R₁ and R₂ are each selected from the class consisting of the hydrogen atoms and lower alkyl groups, which comprises heating a 2:5-dihydrofuran of the general formula:

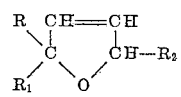

in the presence of an alkali metal alcoholate, selected from the class consisting of the ethoxides, isopropylates and tertiobutylates of sodium and potassium, in alcoholic solution.

7. A process for the production of a 2:3-dihydrofuran of the general formula:

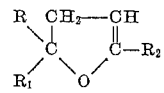

wherein R, R₁ and R₂ are each selected from the class consisting of the hydrogen atoms and lower alkyl groups, which comprises heating, at a temperature of 100–250° C., a 2:5-dihydrofuran of the general formula:

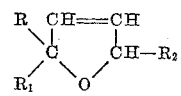

in the presence of an alkali metal alcoholate, selected from the class consisting of the ethoxides, isopropylates and tertiobutylates of sodium and potassium, in alcoholic solution.

8. A process for the production of a 2:3-dihydrofuran of the general formula:

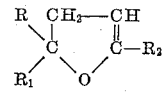

wherein R, R₁ and R₂ are each selected from the class consisting of the hydrogen atoms and lower alkyl groups, which comprises heating, at a temperature of 100–250° C. in a sealed vessel, a 2:5-dihydrofuran of the general formula:

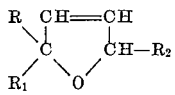

in the presence of an alkali metal alcoholate, selected from the class consisting of the ethoxides, isopropylates and tertiobutylates of sodium and potassium, in alcoholic solution.

9. A process for the production of a 2:3-dihydrofuran of the general formula:

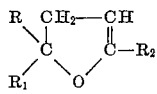

wherein R, R₁ and R₂ are each selected from the class consisting of the hydrogen atoms and lower alkyl groups, which comprises heating, at a temperature of 100–250° C. in a sealed vessel, a 2:5-dihydrofuran of the general formula:

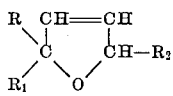

in the presence of an alkali metal alcoholate, selected from the class consisting of the ethoxides, isopropylates and tertiobutylates of sodium and potassium, in alcoholic solution, the proportion of alcoholate being between 5 and 100 mols. per 100 mols of the said 2:5-dihydrofuran.

10. A process for the production of 2:3-dihydrofuran containing 2 lower alkyl groups in the 2-position which comprises heating 2:5-dihydrofuran containing two lower alkyl groups as substituents in the 2-position with an alkali metal alcoholate.

MAURICE LOUIS AUGUSTE FLUCHAIRE.
GEORGES COLLARDEAU.

No references cited.